United States Patent
Kume

(10) Patent No.: US 8,432,469 B2
(45) Date of Patent: Apr. 30, 2013

(54) PHOTOELECTRIC CONVERSION DEVICE

(75) Inventor: Atsuko Kume, Sagamihara (JP)

(73) Assignee: Olympus Corporation, Tokyo (JP)

( * ) Notice: Subject to any disclaimer, the term of this patent is extended or adjusted under 35 U.S.C. 154(b) by 142 days.

(21) Appl. No.: 12/877,452

(22) Filed: Sep. 8, 2010

(65) Prior Publication Data

US 2011/0058078 A1 Mar. 10, 2011

(30) Foreign Application Priority Data

Sep. 9, 2009 (JP) ................ P2009-208475

(51) Int. Cl.
*H04N 3/14* (2006.01)
*H01L 27/00* (2006.01)

(52) U.S. Cl.
USPC .............. 348/294; 348/302; 250/208.1

(58) Field of Classification Search .......... 348/308, 348/294, 302; 250/208.1
See application file for complete search history.

(56) References Cited

U.S. PATENT DOCUMENTS

| | | | |
|---|---|---|---|
| 5,396,247 A * | 3/1995 | Watanabe et al. ............. | 341/157 |
| 7,671,313 B2 | 3/2010 | Watanabe | |
| 2006/0243885 A1 | 11/2006 | Watanabe | |
| 2006/0273831 A1* | 12/2006 | Maksimovic et al. ........ | 327/103 |
| 2009/0244338 A1* | 10/2009 | Kume ............................ | 348/294 |
| 2010/0073542 A1 | 3/2010 | Watanabe | |
| 2010/0110252 A1* | 5/2010 | Shimomura et al. .......... | 348/302 |
| 2011/0169988 A1* | 7/2011 | Tanaka ........................... | 348/294 |
| 2011/0233381 A1* | 9/2011 | Kume ............................. | 250/208.1 |

FOREIGN PATENT DOCUMENTS

| | | |
|---|---|---|
| JP | 03-060073 A | 3/1991 |
| JP | 5-95099 A | 4/1993 |
| JP | 2001-324390 A | 11/2001 |
| JP | 2006-287879 A | 10/2006 |
| JP | 2007-312288 A | 11/2007 |
| JP | 2008-60269 A | 3/2008 |
| JP | 2009-200546 A | 9/2009 |

OTHER PUBLICATIONS

Japanese Office Action mailed Feb. 5, 2013, issued in related Japanese Patent Application 2009-221774, (6 pages). With English Translation.
Japanese Office Action mailed Mar. 5, 2013, issued in corresponding Japanese Patent Application No. 2009-208475, with English translation (4 pages).

\* cited by examiner

*Primary Examiner* — Tuan Ho
*Assistant Examiner* — Shahbaz Nazrul
(74) *Attorney, Agent, or Firm* — Westerman, Hattori, Daniels & Adrian, LLP

(57) ABSTRACT

A photoelectric conversion device may include a plurality of A/D converters each of which receives a pixel signal from a pixel array that includes pixels arranged two-dimensionally. Each of the pixels may have a photoelectric conversion element. The pixel array may output the pixel signal in accordance with an incident light amount to the photoelectric conversion element. The plurality of A/D converters may convert the pixel signal to a digital value based on a reference voltage. The plurality of A/D converters may output the digital value. A reference voltage wire, which supplies the reference voltage to each of the plurality of A/D converters, may be branched into a plurality of branched reference voltage wires each of which is corresponding to one of the plurality of A/D converters. Each of the plurality of branched reference voltage wires may be connected only to constituent components in a corresponding A/D converter.

18 Claims, 7 Drawing Sheets

US 8,432,469 B2

PHOTOELECTRIC CONVERSION DEVICE

BACKGROUND OF THE INVENTION

1. Field of the Invention

The present invention relates to a photoelectric conversion device used in a digital camera, a digital video camera, an endoscope, and the like.

Priority is claimed on Japanese Patent Application No. 2009-208475, filed Sep. 9, 2009, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, a solid-state image-pickup device is used as a photoelectric conversion device used in a digital camera, a digital video camera, an endoscope, and the like. Digital cameras, digital video cameras, endoscopes, and the like including the solid-state image-pickup device are increasingly being made smaller and with reduced power consumption. Therefore, there is a need to make the solid-state image-pickup device smaller and with reduced power consumption.

To response to this need, Japanese Unexamined Patent Application, First Publication, No. 2006-287879 discloses a solid-state image-pickup device that internally incorporates an A/D converter configured as a digital circuit.

FIG. 5 is a block diagram illustrating a schematic configuration of a solid-state image-pickup device in accordance with the related art. The solid-state image-pickup device includes a plurality of array blocks (subarrays) arranged in two dimensions. As an example, in the solid-state image-pickup device of FIG. 5, the array blocks (subarrays) B1, B2, ..., B20 are arranged in four rows and five columns. Each array block (subarray) includes a two-dimensionally arranged pixel block 90 in which a photoelectric conversion element outputs a pixel signal in accordance with an incident light amount, and an A/D converter 9 that converts the pixel signal output from the pixel of the pixel block 90 from analog to digital.

FIG. 6 is a block diagram illustrating an example of a circuit configuration of an A/D converter 9 included in each of the array blocks (subarrays) of FIG. 5. The A/D converter 9 includes a delay circuit 901 and an encoder 902. The delay circuit 901 includes a plurality of delay units, each of which includes various types of gate circuits, and the delay units are connected in a ring shape. An input signal (input voltage) that will be the object of an analog-digital conversion is input to each delay unit in the delay circuit 901 as a drive voltage for the delay units. Also, a reference voltage is supplied to each delay unit in the delay circuit 901.

In the A/D converter 9 of FIG. 6, if, for example, the reference voltage of the delay circuit 901 is GND, and a high-level signal is input as the input pulse signal φPL, then the input pulse signal φPL will have a delay time that corresponds to the voltage difference between the input signal and the reference voltage (GND) as it passes sequentially through the delay units and circulates around the delay circuit 901. If the input pulse signal φPL is set to the low level, then it will stop circulating around the delay circuit 901.

When the input pulse signal φPL is circulating around the delay circuit 901, the number of stages of the delay units that the input pulse signal φPL passes through within a predetermined period of time is determined based on the delay time of the delay units, i.e. the voltage difference between the input signal and the reference voltage (GND). The encoder 902 detects the passed number of stages of delay units (and the number of circulations).

The encoder 902 includes a counter circuit 9021, a latch and encoder circuit 9022, and an adder 9023. The counter circuit 9021 counts the number of circulations of the input pulse signal φPL around the delay circuit 901. The latch and encoder circuit 9022 detects the number of stages of the input pulse signal φPL travelling around the delay circuit 901. The counter circuit 9021 outputs, for example, a bits of upper bit data. The latch and encoder circuit 9022 outputs, for example, b bits of lower bit data. The adder 9023 outputs a+b bits of digital data. The output value of the adder 9023 becomes a digital value after analog-digital conversion in accordance with the voltage of the input signal. In the solid-state image-pickup device of FIG. 5, the pixel signal output from the pixel block 90 is used as the input signal of the A/D converter 9, whereby a digital value in accordance with the incident light amount is output.

FIG. 7 is a block diagram illustrating an example of the photoelectric conversion device that includes the A/D converter 9 of FIG. 6, which is disposed in each column of the pixel array 3. The photoelectric conversion device of FIG. 7 includes pixels P11, ..., P45, a vertical scanning circuit 4, column circuits 51, ..., 55, a horizontal scanning circuit 6, a control circuit 7, and A/D converters (ADCs) 91, ..., 95. A pixel 2 indicates any one of the pixels P11, ..., P45. A column circuit 5 indicates any one of the column circuits 51, ..., 55. An ADC 9 indicates any one of the ADCs 91, ..., 95. In FIG. 7, the pixels P11, ..., P45 are arranged two-dimensionally in four rows and five columns to configure a pixel array 3. In FIG. 7, signal wires between each delay unit in the delay circuit 901 and the latch and encoder circuit 9022 that are illustrated in FIG. 6 are omitted.

The pixels P11, ..., P45 are photoelectric conversion elements. If a pixel 2 is selected by the vertical scanning circuit 4, then the pixel 2 outputs a pixel signal which level is based on the incident light amount. The pixels P11, ..., P45 outputs pixel signals φP1, ..., φP5 for each column of the pixels in the pixel array 3. The first numerical digit that follows 'pixel P' indicates the number of that row in the pixel array 3, and the last numerical digit indicates the number of the column.

The column circuits 51, ..., 55 are disposed in each column of the pixels in the pixel array 3. The column circuits 51, ..., 55 process the pixel signal read out from the pixel 2 and output it to the ADCs 91, ..., 95 of the corresponding column of the pixels. The numerical digit that follows 'column circuit 5' of the column circuits 51, ..., 55 indicates the number of the column in the pixel array 3.

The ADCs 91, ..., 95 are disposed in each column of the pixels in the pixel array 3. The ADCs 91, ..., 95 receive the pixel signal that is processed and output from each of the column circuits 51, ..., 55. Then the ADCs 91, ..., 95 converts the pixel signal from analog to digital and outputs the converted digital value. Each of the ADCs 91, ..., 95 has the same circuit configuration as the A/D converter 9 of FIG. 6. The reference voltage (GND) is supplied to the delay circuit 901 in the ADC 9. The numerical digit that follows 'ADC 9' of the ADCs 91, ..., 95 indicates the number of the column in the pixel array 3.

The vertical scanning circuit 4 receives a vertical control signal from the control circuit 7. The vertical scanning circuit 4 selects a row of the pixel 2 that is read out from the pixel array 3 based on the vertical control signal, which is received from the control circuit 7. The vertical scanning circuit 4 outputs row selection signals φSL1, . . . , φSL4 corresponding to the row of the pixel 2 that is read out from the pixel array 3. For example, when the first row of the pixel array 3 is selected, the vertical scanning circuit 4 sets row selection signal φSL1 to the select level (e.g. the high level) and outputs it to the pixel array 3; meanwhile, it sets the unselected row selection signals φSL2, . . . , φSL4 to the non-selected level (e.g. the low level) and outputs them to the pixel array 3.

The horizontal scanning circuit 6 receives a horizontal control signal from the control circuit 7. The horizontal scanning circuit 6 makes the ADCs 91, . . . , 95 output the digital values, which are converted by the ADCs 91, . . . , 95 from analog to digital, in each column based on the horizontal control signal received from the control circuit 7, and sets this output as the output of the photoelectric conversion device. The horizontal scanning circuit 6 outputs column selection signals φH1, . . . , φH5, which correspond to the column of the digital value that is read out from the ADC 9, to the ADC 9. For example, when outputting the digital value of the first column of the pixel array 3, the horizontal scanning circuit 6 sets column selection signal φH1 to the output permission level (e.g. the high level) and outputs it to the ADC 91; meanwhile, it sets the unselected column selection signals φH2, . . . , φH4 to the output not-permitted level (e.g. the low level) and outputs them to the ADCs 92, . . . , 95. The horizontal scanning circuit 6 then sequentially outputs the column selection signals φH2, . . . , φH5 at the output permission level (e.g. the high level), and the other column selection signals φH1, . . . , φH5 corresponding to the non-output columns at the output not-permitted level (e.g. the low level), to the ADC 9. In this way, the horizontal scanning circuit 6 makes the ADC 9 sequentially output the digital values, which the ADC 9 converted from analog to digital.

The control circuit 7 controls the entire photoelectric conversion device. In accordance with an image capture command from an external unit that is not illustrated in the figures, the control circuit 7 outputs a vertical control signal for controlling the vertical scanning circuit 4 and a horizontal control signal for controlling the horizontal scanning circuit 6.

The control circuit 7 also controls the operations (start and stop) of the column circuit 5 and the ADC 9.

SUMMARY

A photoelectric conversion device may include a pixel array that includes a plurality of pixels arranged two-dimensionally, each of the plurality of pixels having a photoelectric conversion element, the pixel array outputting a pixel signal in accordance with an incident light amount to the photoelectric conversion element, and a plurality of A/D converters each of which receives the pixel signal from the pixel array, converts the pixel signal to a digital value based on a reference voltage, and outputs the digital value. A reference voltage wire, which supplies the reference voltage to each of the plurality of A/D converters, may be branched into a plurality of branched reference voltage wires each of which is corresponding to one of the plurality of A/D converters. Each of the plurality of branched reference voltage wires may be connected only to constituent components in a corresponding A/D converter.

The reference voltage wire may be arranged to extend in a first direction of the pixel array. Each of the plurality of branched reference voltage wire may be arranged to extend in a second direction of the pixel array that is different from the first direction of the pixel array. The plurality of A/D converters may be arranged in the first direction of the pixel array. Each of the plurality of A/D converters may include a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter, and an encoder that outputs the digital value based on the number of the plurality of delay units that the pulse signal passes through within a predetermined period of time.

A branch point, a first connection point, and a second connection point may be arranged in the second direction in the sequence of the branch point, the first connection point, and the second connection point. Each of the plurality of branched reference voltage wires may be separated from the reference voltage wire at the branch point. The pulse delay circuit may be connected to each of the plurality of branched reference voltage wires at the first connection point in the A/D converter. The encoder may be connected to each of the plurality of branched reference voltage wires at the second connection point in the A/D converter.

The first direction may be a row direction of the pixel array. The second direction may be a column direction of the pixel array. The number of the plurality of A/D converters may be based on the number of columns of the pixel array.

The encoder may include a latch circuit that includes a plurality of latch units each of which corresponds to the plurality of delay units included in the pulse delay circuit, each of the plurality of latch units storing delay information that is output from each of the plurality of delay units, and an encoder unit that outputs the digital value based on the delay information that is stored in the latch circuit. A branch point, a first connection point, and a second connection point may be arranged in the second direction in the sequence of the branch point, the first connection point, and the second connection point. Each of the plurality of branched reference voltage wires may be separated from the reference voltage wire at the branch point. Each of the delay units may be connected to each of the plurality of branched reference voltage wires at the first connection point in the A/D converter. Each of the latch units corresponding to each of the delay units may be connected to each of the plurality of branched reference voltage wires at the second connection point in the A/D converter. A plurality of the first connection points in the A/D converter, a plurality of the second connection points in the A/D converter, and a third connection point may be arranged in the second direction. The encoder unit may be connected to each of the plurality of branched reference voltage wires at the third connection point in the A/D converter. The plurality of the first connection points and the plurality of the second connection points may be arranged between the branch point and the third connection point.

The first direction may be a row direction of the pixel array. The second direction may be a column direction of the pixel array. The number of the plurality of A/D converters may be based on the number of columns of the pixel array.

A photoelectric conversion device may include a pixel array that includes a plurality of pixels arranged two-dimensionally, each of the plurality of pixels having a photoelectric conversion element, the pixel array outputting a pixel signal in accordance with an incident light amount to the photoelectric conversion element, a plurality of A/D converters each of which receives the pixel signal from the pixel array, converts the pixel signal to a digital value based on a reference voltage, and outputs the digital value, a reference voltage wire that supplies the reference voltage to each of the plurality of A/D converters, and a plurality of branched reference voltage wires each of which is corresponding to one of the plurality of A/D converters, the reference voltage wire being branched into the plurality of branched reference voltage wires, each of the plurality of branched reference voltage wires being connected only to constituent components in a corresponding A/D converter.

The reference voltage wire may be arranged to extend in a first direction of the pixel array. Each of the plurality of branched reference voltage wire may be arranged to extend in a second direction of the pixel array that is different from the first direction of the pixel array. The plurality of A/D converters may be arranged in the first direction of the pixel array. Each of the plurality of A/D converters may include a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter, and an encoder that outputs the digital value based on the number of the plurality of delay units that the pulse signal passes through within a predetermined period of time.

A branch point, a first connection point, and a second connection point may be arranged in the second direction in the sequence of the branch point, the first connection point, and the second connection point. Each of the plurality of branched reference voltage wires may be separated from the reference voltage wire at the branch point. The pulse delay circuit may be connected to each of the plurality of branched reference voltage wires at the first connection point in the A/D converter. The encoder may be connected to each of the plurality of branched reference voltage wires at the second connection point in the A/D converter.

The first direction may be a row direction of the pixel array. The second direction may be a column direction of the pixel array. The number of the plurality of A/D converters may be based on the number of columns of the pixel array.

The encoder may include a latch circuit that includes a plurality of latch units each of which corresponds to the plurality of delay units included in the pulse delay circuit, each of the plurality of latch units storing delay information that is output from each of the plurality of delay units, and an encoder unit that outputs the digital value based on the delay information that is stored in the latch circuit. A branch point, a first connection point, and a second connection point may be arranged in the second direction in the sequence of the branch point, the first connection point, and the second connection point. Each of the plurality of branched reference voltage wires may be separated from the reference voltage wire at the branch point. Each of the delay units may be connected to each of the plurality of branched reference voltage wires at the first connection point in the A/D converter. Each of the latch units corresponding to each of the delay units may be connected to each of the plurality of branched reference voltage wires at the second connection point in the A/D converter. A plurality of the first connection points in the A/D converter, a plurality of the second connection points in the A/D converter, and a third connection point may be arranged in the second direction. The encoder unit may be connected to each of the plurality of branched reference voltage wires at the third connection point in the A/D converter. The plurality of the first connection points and the plurality of the second connection points may be arranged between the branch point and the third connection point.

The first direction may be a row direction of the pixel array. The second direction may be a column direction of the pixel array. The number of the plurality of A/D converters may be based on the number of columns of the pixel array.

A photoelectric conversion device may include a plurality of A/D converters each of which receives a pixel signal from a pixel array that includes a plurality of pixels arranged two-dimensionally, each of the plurality of pixels having a photoelectric conversion element, the pixel array outputting the pixel signal in accordance with an incident light amount to the photoelectric conversion element, the plurality of A/D converters converting the pixel signal to a digital value based on a reference voltage, the plurality of A/D converters outputting the digital value. A reference voltage wire, which supplies the reference voltage to each of the plurality of A/D converters, may be branched into a plurality of branched reference voltage wires each of which is corresponding to one of the plurality of A/D converters. Each of the plurality of branched reference voltage wires may be connected only to constituent components in a corresponding A/D converter.

The reference voltage wire may be arranged to extend in a first direction of the pixel array. Each of the plurality of branched reference voltage wire may be arranged to extend in a second direction of the pixel array that is different from the first direction of the pixel array. The plurality of A/D converters may be arranged in the first direction of the pixel array. Each of the plurality of A/D converters may include a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter, and an encoder that outputs the digital value based on the number of the plurality of delay units that the pulse signal passes through within a predetermined period of time.

A branch point, a first connection point, and a second connection point may be arranged in the second direction in the sequence of the branch point, the first connection point, and the second connection point. Each of the plurality of branched reference voltage wires may be separated from the reference voltage wire at the branch point. The pulse delay circuit may be connected to each of the plurality of branched reference voltage wires at the first connection point in the A/D converter. The encoder may be connected to each of the plurality of branched reference voltage wires at the second connection point in the A/D converter.

The first direction may be a row direction of the pixel array. The second direction may be a column direction of the pixel array. The number of the plurality of A/D converters may be based on the number of columns of the pixel array.

The encoder may include a latch circuit that includes a plurality of latch units each of which corresponds to the plurality of delay units included in the pulse delay circuit, each of the plurality of latch units storing delay information that is output from each of the plurality of delay units, and an encoder unit that outputs the digital value based on the delay information that is stored in the latch circuit. A branch point, a first connection point, and a second connection point may be arranged in the second direction in the sequence of the branch point, the first connection point, and the second connection point. Each of the plurality of branched reference voltage wires may be separated from the reference voltage wire at the branch point. Each of the delay units may be connected to each of the plurality of branched reference voltage wires at the first connection point in the A/D converter. Each of the latch units corresponding to each of the delay units may be connected to each of the plurality of branched reference voltage wires at the second connection point in the A/D converter. A plurality of the first connection points in the A/D converter, a plurality of the second connection points in the A/D converter, and a third connection point may be arranged in the second direction. The encoder unit may be connected to each of the plurality of branched reference voltage wires at the third connection point in the A/D converter. The plurality of the first connection points and the plurality of the second connection points may be arranged between the branch point and the third connection point.

The first direction may be a row direction of the pixel array. The second direction may be a column direction of the pixel array. The number of the plurality of A/D converters may be based on the number of columns of the pixel array.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

First Preferred Embodiment

Figure 1:
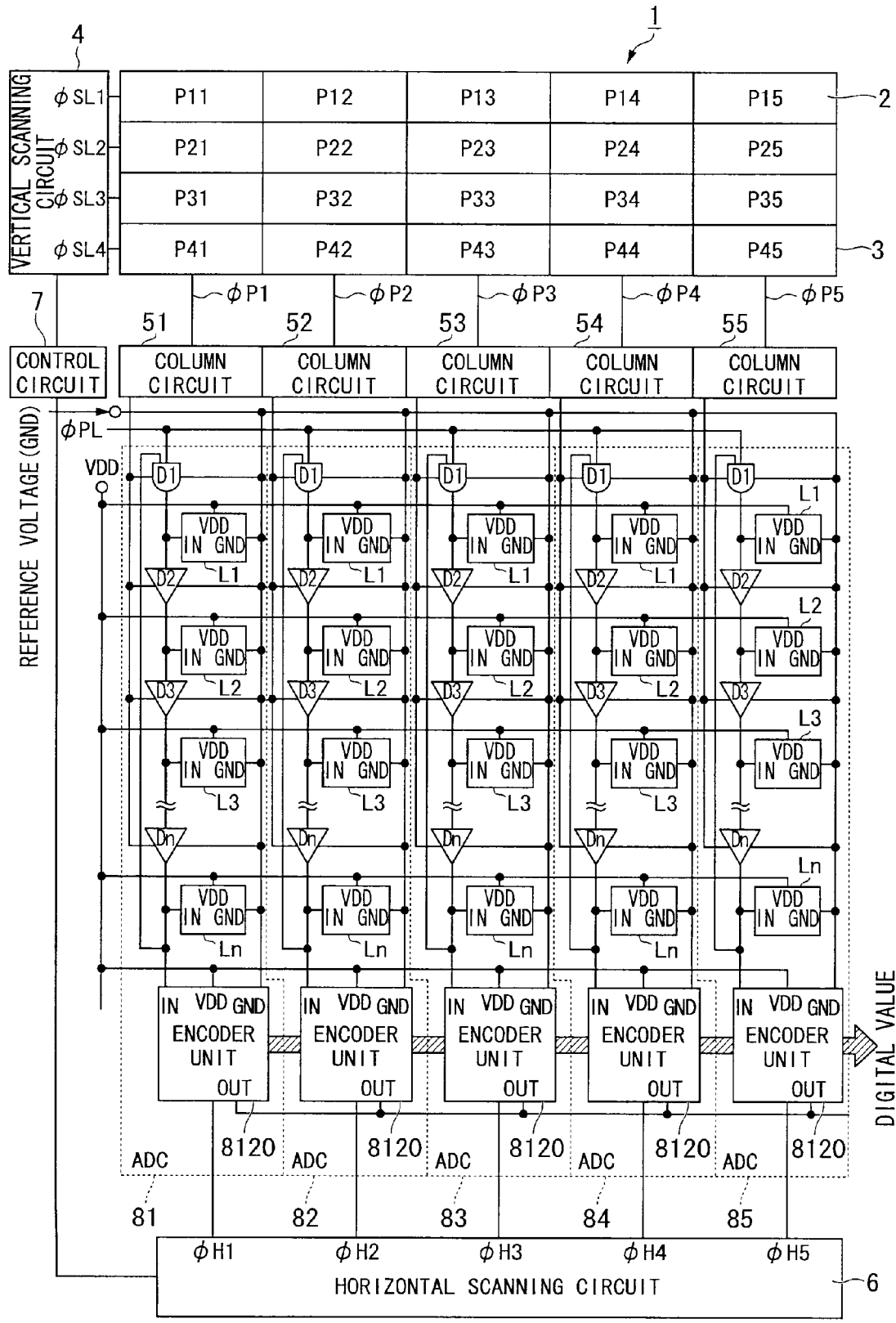
FIG. 1 is a block diagram illustrating a schematic configuration of a photoelectric conversion device in accordance with a first preferred embodiment of the present invention.

A first preferred embodiment of the present invention will be described. FIG. 1 is a block diagram illustrating a schematic configuration of a photoelectric conversion device 1 in accordance with a first preferred embodiment of the present invention. In FIG. 1, the photoelectric conversion device 1 includes pixels P11, . . . , P45, a vertical scanning circuit 4, column circuits 51, . . . , 55, a horizontal scanning circuit 6, a control circuit 7, and A/D converters 81, . . . , 85. The A/D converter may be hereinafter referred to as an ADC. In the photoelectric conversion device 1 of FIG. 1, the pixels P11, . . . , P45 are arranged two-dimensionally in four rows and five columns to form a pixel array 3. Pixel 2 indicates any one of the pixels P11, . . . , P45. Column circuit 5 indicates any one of the column circuits 51, . . . , 55. ADC 8 indicates any one of the ADCs 81, . . . , 85.

The pixels P11, . . . , P45 are photoelectric conversion elements. If the vertical scanning circuit 4 selects the pixel 2, then the pixel 2 outputs a pixel output signal at a level in accordance with the incident light amount. The pixels P11, . . . , P45 also output pixel output signals $\phi$P1, . . . , $\phi$P5 for each pixel column in the pixel array 3. The first numerical digit that follows 'pixel P' indicates the number of that row in the pixel array 3, and the last numerical digit indicates the number of the column.

The column circuits 51, . . . , 55 are respectively disposed in each pixel column of the pixel array 3. The column circuits 51, . . . , 55 process the pixel output signal read from the pixel 2, and output it to the ADC 81, . . . , 85 of the corresponding pixel column. The numerical digit that follows 'column circuit 5' of the column circuits 51, . . . , 55 indicates the number of the column in the pixel array 3.

The ADCs 81, . . . , 85 are A/D converters, and are disposed in each pixel column in the pixel array 3. The ADCs 81, . . . , 85 each receive a processed pixel signal from their respective column circuits 51, . . . , 55, subject it to an analog-digital conversion, and output a converted digital value. The numerical digit that follows 'ADC 8' of the ADCs 81, . . . , 85 indicates the number of the column in the pixel array 3. The ADC 8 will be described in more detail later.

The vertical scanning circuit 4 receives a vertical control signal from the control circuit 7. In accordance with this vertical control signal received from the control circuit 7, the vertical scanning circuit 4 selects a row of the pixel 2 for reading from the pixel array 3. The vertical scanning circuit 4 outputs a row selection signal $\phi$SL1, . . . , $\phi$SL4 that corresponds to the row of the pixel 2 for reading from the pixel array 3. For example, when the first row of the pixel array 3 is selected, the vertical scanning circuit 4 sets row selection signal $\phi$SL1 to the select level (e.g. the high level) and outputs it to the pixel array 3; meanwhile, it sets the unselected row selection signals $\phi$SL2, . . . , $\phi$SL4 to the non-selected level (e.g. the low level) and outputs them to the pixel array 3.

The horizontal scanning circuit 6 receives a horizontal control signal from the control circuit 7. In accordance with the horizontal control signal received from the control circuit 7, the horizontal scanning circuit 6 makes the ADCs 81, . . . , 85 output the digital values, which are converted by the ADCs 81, . . . , 85 from analog to digital, in each column based on the horizontal control signal received from the control circuit 7, and sets this output as the output of the photoelectric conversion device 1. The horizontal scanning circuit 6 outputs column selection signals $\phi$H1, . . . , $\phi$H5, which corresponds to the column of the digital value for reading from the ADC 8, to the ADC 8. For example, when outputting the digital value of the first column of the pixel array 3, the horizontal scanning circuit 6 sets column selection signal $\phi$H1 to the select level (e.g. the high level) and outputs it to the ADC 81; meanwhile, it sets the unselected column selection signals $\phi$H2, . . . , $\phi$H4 to the non-selected level (e.g. the low level) and outputs them to the ADCs 82, . . . , 85. The horizontal scanning circuit 6 then sequentially outputs the column selection signals $\phi$H2, . . . , $\phi$H5 at the output permission level (e.g. the high level), and the other column selection signals $\phi$H1, . . . , $\phi$H5 corresponding to the non-output columns at the output not-permitted level (e.g. the low level), to the ADC 8. In this way, the horizontal scanning circuit 6 makes the ADC 8 sequentially output the digital data values it converted.

The control circuit 7 controls the entire photoelectric conversion device 1. In accordance with an image capture command from an external unit that is not illustrated in the figures, the control circuit 7 outputs a vertical control signal for controlling the vertical scanning circuit 4 and a horizontal control signal for controlling the horizontal scanning circuit 6.

The control circuit 7 also controls the operations (start and stop) of the column circuit 5 and the ADC 8.

Figure 2:
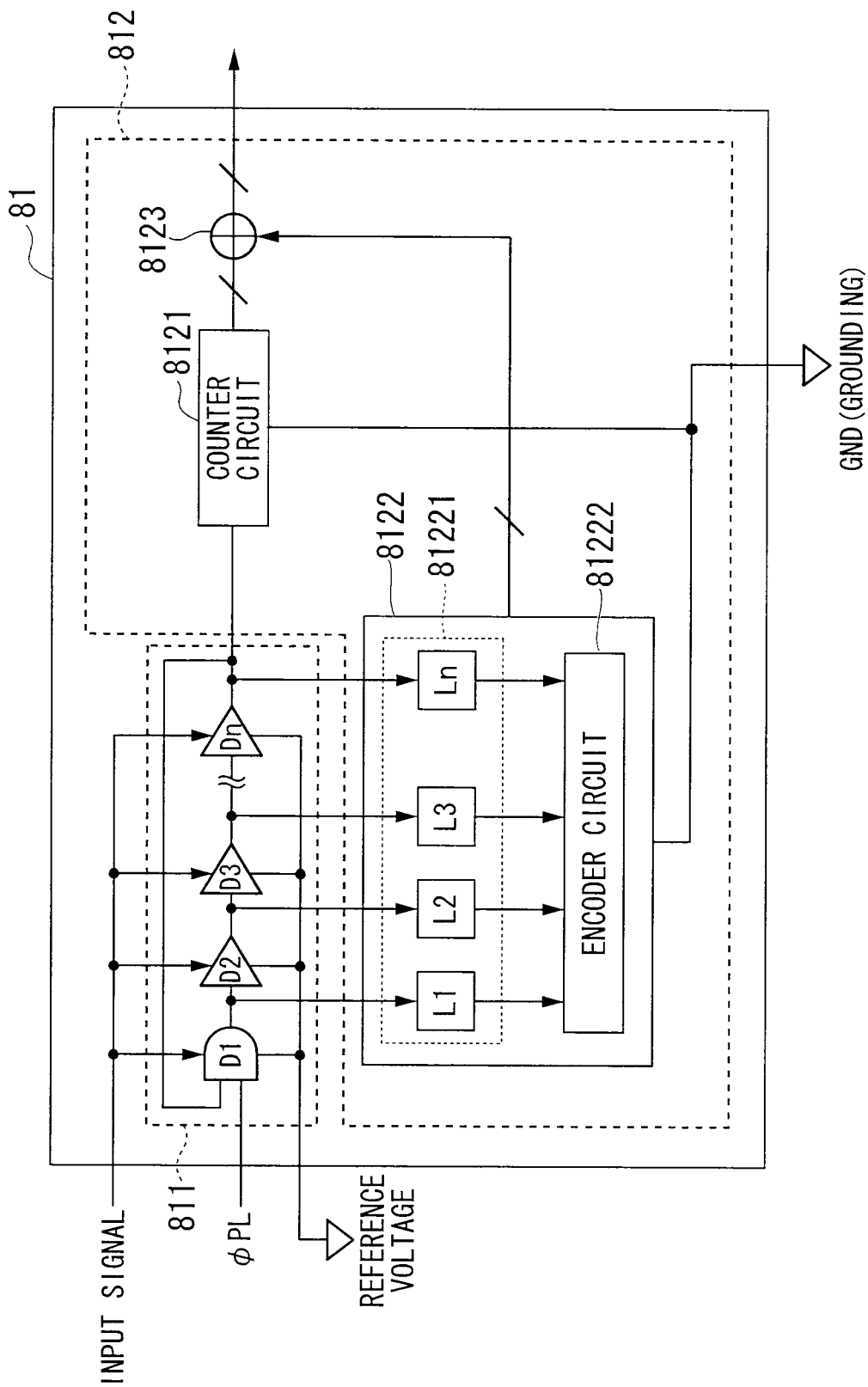
FIG. 2 is a block diagram illustrating a schematic configuration of the A/D converter included in the photoelectric conversion device in accordance with the first preferred embodiment of the present invention.

Subsequently, the A/D converter of the photoelectric conversion device 1 in accordance with the first preferred embodiment of the present invention will be described. FIG. 2 is a block diagram illustrating a schematic configuration of the A/D converter included in the photoelectric conversion device 1 in accordance with the first preferred embodiment of the present invention. Of the A/D converters included in the pixel columns of the photoelectric conversion device 1, by way of example FIG. 2 shows ADC 81 that corresponds to the first column of the pixel array 3. The configurations of the ADCs 82, . . . , 85 corresponding to the other pixel columns are the same as that of ADC 81 illustrated in FIG. 2.

In FIG. 2, the ADC 81 includes a delay circuit 811 and an encoder 812. The encoder 812 includes a counter circuit 8121, a latch and encoder circuit 8122, and an adder 8123. The latch and encoder circuit 8122 includes a latch circuit 81221 and an encoder circuit 81222 for each delay unit in the delay circuit 811.

In accordance with a timing signal for starting analog-digital conversion that is not illustrated in the figures, the ADC 81 subjects a pixel signal received from the column circuit 51 to analog-digital conversion. In accordance with a timing signal for stopping analog-digital conversion that is not illustrated in the figures, the digital value of the pixel signal that was subjected to analog-digital conversion is stored in an output control circuit, which is not illustrated in the figures, in the ADC 81. The ADC 81 outputs the digital value stored in the output control circuit, which is not illustrated in the figures, in accordance with a column selection signal φH1 received from the horizontal scanning circuit 6.

The delay circuit 811 is a ring delay line (RDL) wherein a plurality of delay units are connected in a ring shape. Each of the plurality of delay units includes various types of gate circuits. The plurality of delay units include, for example, NAND circuits and INV circuits. They include a delay unit D1 provided in a first stage of the configuration of the delay circuit 811, and a plurality of delay units D2, D3, . . . , Dn each of which includes two INV circuits and provided in second and subsequent stages of the configuration of the delay circuit 811. An input signal (voltage) that becomes the object of analog-digital conversion is supplied as a drive voltage to each delay unit in the delay circuit 811. Also, a reference voltage is supplied to each delay unit in the delay circuit 811. In FIG. 2, the reference voltage is at ground (GND) level.

For example, if a high-level signal is input as the input pulse signal φPL of the delay circuit 811, then the input pulse signal φPL will have a delay time that corresponds to the voltage difference between the input signal and the reference voltage (GND) as it passes sequentially through the delay units and circulates around the delay circuit 811. When the input pulse signal φPL is circulating around the delay circuit 811, the number of stages of delay units that the input pulse signal φPL passes through within a predetermined period of time is determined according to the delay time of the delay units, i.e. the voltage difference between the input signal and the reference voltage (GND in this example).

The encoder 812 detects the number of stages of delay units that the input pulse signal φPL passed in the delay circuit 811 and the number of circulations of the input pulse signal φPL around the delay circuit 811, and outputs a digital value which is the result of an analog-digital conversion of the number of passed stages and number of circulations performed by the ADC 81.

In accordance with a timing signal for completing analog-digital conversion, which is not illustrated in the figures, that is input after a predetermined time elapses, the latch circuit 81221 stores output data of each delay unit in the delay circuit 811. The latch circuit 81221 includes latch units L1, L2, L3, . . . , Ln corresponding to each of the delay units D1, D2, D3, . . . , Dn in the delay circuit 811. The latch units L1, L2, L3, . . . , Ln store output data of their corresponding delay unit, in accordance with the timing signal for completing analog-digital conversion. In FIG. 2, the latch unit L1 stores the output value of its corresponding delay unit D1, the latch unit L2 stores the output value of its corresponding delay unit D2, the latch unit L3 stores the output value of its corresponding delay unit D3, and the latch unit Ln stores the output value of its corresponding delay unit Dn.

A signal, which has the same level as the reference voltage (GND) supplied to each delay unit in the delay circuit 811, is output to the GND terminal of the latch circuit 81221. In FIG. 2, the reference voltage and the GND (ground) have the same potential. The potential wire of the reference voltage or the potential wire of the GND (ground) is hereinafter referred to as 'a reference voltage wire'. If the delay unit in the delay circuit 811 and the latch unit in the latch circuit 81221 are disposed alternately as illustrated in FIG. 2, the reference voltage wire is first connected to the delay units in the delay circuit 811 and then is connected to corresponding latch units. More specifically, in the photoelectric conversion device 1 of FIG. 1, the reference voltage wire, which is arranged to extend in the row direction of the pixel array 3, is branched for use in each constituent component of the ADC 81 and is connected to each constituent component of the ADC 81. The reference voltage wire for the ADC 81 is connected in series to the delay unit D1, the latch unit L1, the delay unit D2, the latch unit L2, . . . , the delay unit Dn, and the latch unit Ln, seen from the branch point of the reference voltage wire. The reference voltage wire is connected to the delay unit as a reference potential. The reference voltage wire connected to the GND terminal in the latch unit.

From the values stored by the latch circuit 81221, the encoder circuit 81222 detects the number of delay unit stages that the input pulse signal φPL passed inside the delay circuit 811. Based on the change in the output value of the delay unit Dn in the last stage of the delay circuit 811, the counter circuit 8121 detects the number of circulations of the delay circuit 811 made by the input pulse signal φPL. The adder 8123 outputs a digital signal that combines two signals, with the number of circulations of the input pulse signal φPL output from the counter circuit 8121 as its upper bit and the number of passed stages of the input pulse signal φPL output from the latch and encoder circuit 8122 as its lower bit. The output value of the adder 8123 becomes the digital value after analog-digital conversion in accordance with the voltage of the input signal.

The encoder unit 8120 of FIG. 1 includes the encoder circuit 81222, the counter circuit 8121, and the adder 8123. The reference voltage wire (ground: GND level), which is connected to each delay unit in the delay circuit 811 and each latch unit in the latch circuit 81221, is connected to the GND terminal of the encoder unit 8120. As illustrated in FIG. 1, this reference voltage wire is connected to the GND terminal of the latch unit Ln that is the last stage of the latch units and then connected to the GND terminal of the encoder unit 8120.

In accordance with a timing signal for completing analog-digital conversion that is not illustrated in the figures, the digital value output from the adder 8123 is stored in an output control circuit, which is not illustrated in the figures, in the ADC 81. In the photoelectric conversion device 1 of FIG. 1, the ADC 81 receives a processed pixel signal from the column circuit 51 arranged in the first column of the pixel array 3, subjects it to an analog-digital conversion, and outputs a digital value that is in accordance with amount of light incident to the pixel 2 in the first column.

In the same manner as the ADC 81, the ADCs 82, ..., 85 receive a processed pixel signal from the column circuits 52, ..., 55 arranged in respectively corresponding columns of the pixel array 3, and output an A/D converted digital value that is in accordance with the amount of light incident to the pixel 2 in the 2nd, 3rd, ..., 5th columns.

As illustrated in FIG. 1, in the photoelectric conversion device 1, the reference voltage wire (GND), which is arranged to extend in the row direction of the pixel array 3, is branched towards each ADC 8 to be each reference voltage wire (GND) that is connected to each of the ADCs 82, ... 85. Therefore, the reference voltage wire for each ADC 8 is arranged to extend in the column direction of the pixel array 3. Each reference voltage wire for each ADC 8 is connected only to each constituent component in corresponding ADC 8.

Figure 7:
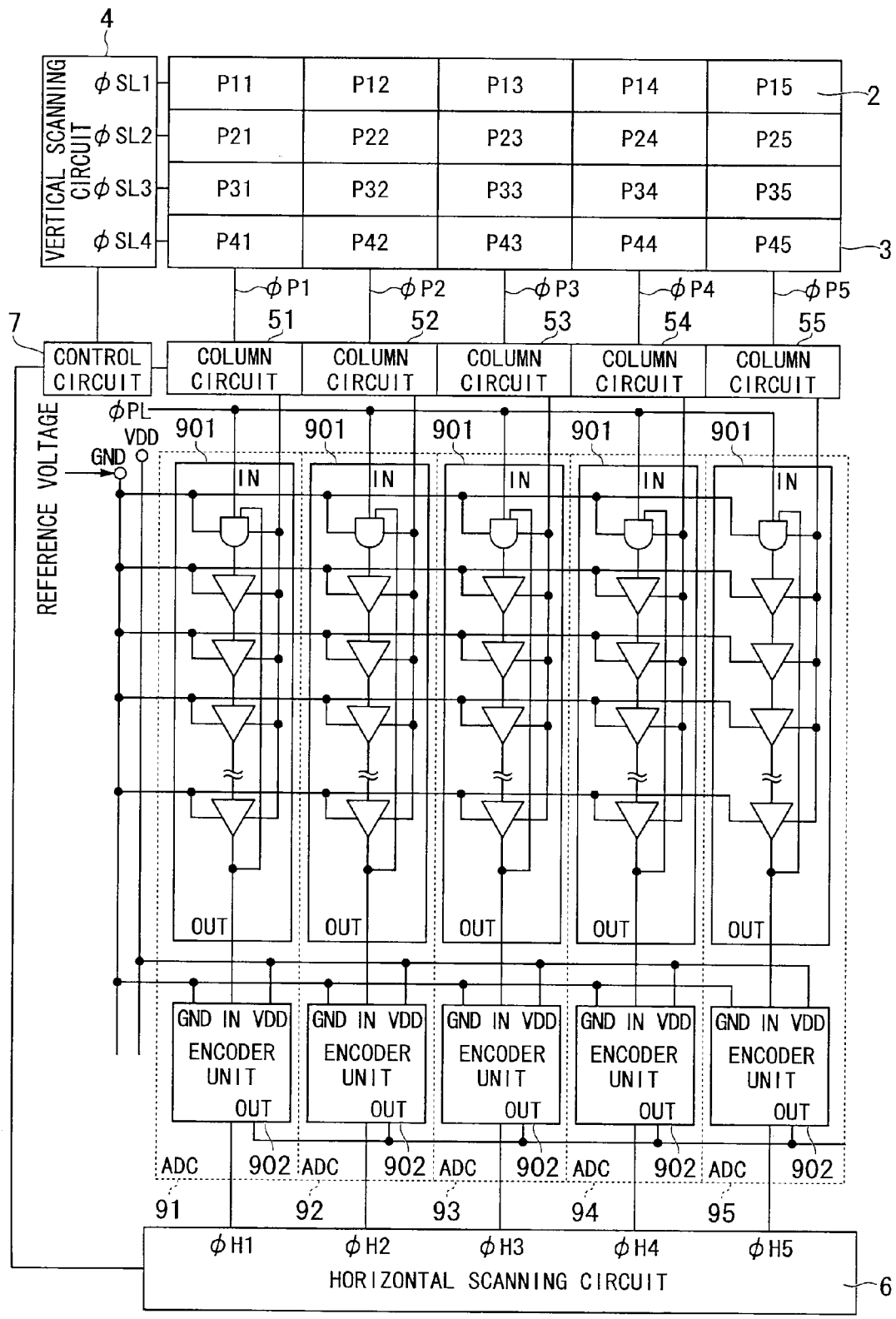
FIG. 7 is a block diagram illustrating a schematic configuration of the photoelectric conversion device in accordance with the related art.

As a result, the arrangement of the reference voltage wire in the photoelectric conversion device 1 in accordance with the first preferred embodiment of the present invention that is illustrated in FIG. 1 and the arrangement of the reference voltage wire in the photoelectric conversion device in accordance with the prior art that is illustrated in FIG. 7 are different in the point described below. In the photoelectric conversion device 1 in accordance with the first preferred embodiment of the present invention, the reference voltage wire is arranged to extend in the row direction of the pixel 3. This reference voltage wire is branched for use in each ADC 8, and extends in the column direction of the pixel 3 to be each reference voltage wire for each ADC 8. The reference voltage wire for each ADC 8 is connected only to the constituent components in corresponding ADC 8 such as the delay circuit 811, the latch 81221, the encoder circuit 81222, and the GND in the example of FIG. 2.

More specifically, as illustrated in FIG. 1, if the ADCs 8 in the photoelectric conversion device 1 are arranged in the sequence of from the left, ADC 81, ADC 82, ADC 83, ADC 84 and ADC 85, the latch units in the latch circuit 811 and the latch units in the latch circuit 81221 are arranged alternately from top to bottom, and the encoder unit 8120 is arranged next to the latch unit Ln, then the reference voltage wire that is arranged to extend in the row direction of the pixel 3 is branched in the sequence of, from the left, the reference voltage wire for ADC 81, the reference voltage wire for ADC 82, the reference voltage wire for ADC 83, the reference voltage wire for ADC 84, and the reference voltage wire for ADC 85. The reference voltage wire for each ADC 8 extends in the column direction of the pixel array 3. The reference voltage wire for each ADC 8 is connected to each constituent component in the corresponding ADC 8. In the ADC 81, the reference voltage wire for the ADC 81 is connected in the sequence of from the branch point of the reference voltage wire, the delay detector D1, the latch unit L1, the delay detector D2, the latch unit L2, the delay detector D3, the latch unit L3, ..., the delay unit Dn, the latch unit Ln, and the encoder 8120. In the same way, the reference voltage wire for ADC 82, the reference voltage wire for ADC 83, the reference voltage wire for ADC 84, and the reference voltage wire for ADC 85 are connected in the sequence of, from the branch point of the reference voltage wire, the delay detector D1, the latch unit L1, the delay detector D2, the latch unit L2, the delay detector D3, the latch unit L3, ..., the delay unit Dn, the latch unit Ln, and the encoder 8120, in each corresponding ADC 8.

By arranging the reference voltage wires as described above, the potentials of the reference voltage wires, which are made by branching the reference voltage wire for each ADC 8 in the row direction of the pixel array 3 at the branch point and are arranged to extend in the row direction of the pixel array 3, can be made almost equal. Further, by connecting the reference voltage wires only to each constituent component in corresponding ADC 8, each ADC 8 can be separated. Thereby, a noise that is made by the operation of the ADC 81 will not affect the operations of the ADC 82, ..., ADC 85, for example. Also, a noise that is made by the operations of the ADC 82, ..., ADC 85 will not affect the operation of the ADC 81. That is, each ADC 8 is not affected by a noise that is made by the operations of other ADC 8. A noise that is made by the operation of each ADC 8 does not affect the operations of other ADC 8.

As is described above, in the first preferred embodiment of the present invention, the reference voltage wire is branched for use in each ADC 8, and the reference voltage wire that is branched for use in each ADC 8 can be connected only to each constituent component in corresponding ADC 8. Thereby, noises generated while each ADC 8 is operating can be separated. For example, the reference voltage of the delay unit included in the ADC 81 is supplied only to the constituent components of the self ADC 81, and is separated from the reference voltage of the delay units included in other A/D converters (ADC 82, ..., ADC 85). Thereby, the ADC 81 can be prevented from affected by noises generated while other A/D converters (ADC 82, ..., ADC 85) are operating. Thereby, even if the photoelectric conversion device includes a plurality of A/D converters, a noise generated while an A/D converter is operating can be prevented from affecting the output of the digital value of other A/D converters. Therefore, degradation of the image data can be prevented, and image data with little noise can be acquired.

Second Preferred Embodiment

Figure 3:
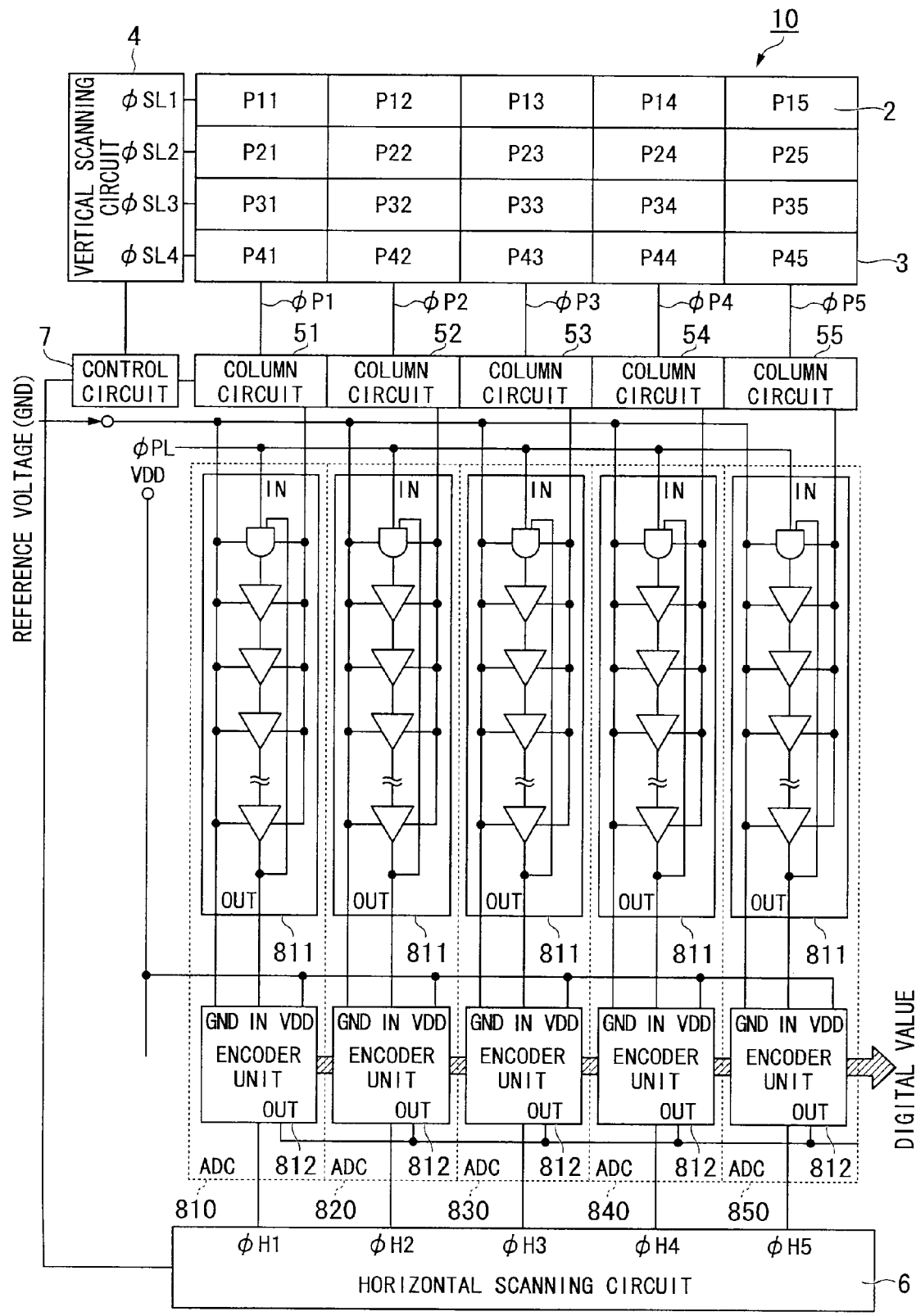
FIG. 3 is a block diagram illustrating a schematic configuration of a photoelectric conversion device 10 in accordance with the second preferred embodiment of the present invention.

A second preferred embodiment of the present invention will be described. FIG. 3 is a block diagram illustrating a schematic configuration of a photoelectric conversion device 10 in accordance with the second preferred embodiment of the present invention. The photoelectric conversion device 10 includes pixels P11, ..., P45, a vertical scanning circuit 4, column circuits 51, ..., 55, a horizontal scanning circuit 6, a control circuit 7, and A/D converters (ADCs) 810, ..., 850. ADC 80 denotes any one of the ADCs 810, ..., 850. In the photoelectric conversion device 10 in accordance with the second preferred embodiment of the present invention that is illustrated in FIG. 3, the ADC 8, which is included in the photoelectric conversion device 1 in accordance with the first preferred embodiment of the present invention, is substituted with the ADC 80. The constituent components are otherwise the same, and will not be repetitiously described.

The only point of difference between the ADC 80 and the ADC 81 of FIG. 2 is the arrangement of the reference voltage wire, and other configurations are the same. Therefore, the operation of the ADC 80 in accordance with the second preferred embodiment of the present invention is the same as the operation of the ADC 8 illustrated in FIG. 1 and FIG. 2, and will not be repetitiously described. In the photoelectric conversion device 1 illustrated in FIG. 1, the encoder unit 8120 includes the counter circuit 8121, the encoder circuit 81222, and the adder 8123 that are illustrated in FIG. 2. On the other hand, in the photoelectric conversion device 10 illustrated in FIG. 3, the encoder unit 812 includes the counter circuit 8121, the latch and encoder circuit 8122 (the latch circuit 81221 and the encoder circuit 81222), and the adder 8123.

In the photoelectric conversion device 10 illustrated in FIG. 3, the reference voltage wire (GND) that is arranged to extend in the row direction of the pixel array 3 is branched towards each ADC 80 to be the reference voltage wire that is connected to each ADC 80. Therefore, the reference voltage wire for each ADC 80 is arranged to extend in the column direction of the pixel array 3. The reference voltage wire for each ADC 80 is connected only to each constituent component of corresponding ADC 80.

Therefore, in the photoelectric conversion device 10 illustrated in FIG. 3, the reference voltage wire is arranged to extend in the row direction of the pixel array 3 as the photoelectric conversion device 1 illustrated in FIG. 1. This reference voltage wire is branched for each ADC 80 to extend in the column direction of the pixel array 3 to be the reference voltage wire for each ADC 80. The reference voltage wire for each ADC 80 is connected only to each constituent component in the ADC 80 such as the delay circuit 811, the encoder circuit 812, and GND in the example of FIG. 2).

Also, as illustrated in FIG. 3, if the delay circuit 811 and the encoder 812 are disposed in the ADC 80, then the reference voltage wire is first connected to all delay units in the delay circuit 811 and then connected to the GND terminal in the encoder 812. Therefore, the point of difference between the arrangement of the reference voltage wire in the photoelectric conversion device 10 illustrated in FIG. 3 and the arrangement of the reference voltage wire in the photoelectric conversion device 1 illustrated in FIG. 1 is that the reference voltage wire in the photoelectric conversion device 10 is connected in the sequence of, from the branch point of the reference voltage wire, the delay circuit 811 and the encoder 812. The delay circuit 811 may be referred to as an analog circuit. The encoder circuit 812 may be referred to as a digital circuit. In the delay circuit 811, the reference voltage wire is connected to the delay unit as reference potential. In the encoder circuit 812, the reference voltage wire is connected to the GND terminal of each constituent component.

More specifically, as illustrated in FIG. 3, if the ADCs 80 in the photoelectric conversion device 10 are arranged in the sequence of, from the left, ADC 810, ADC 820, ADC 830, ADC 840 and ADC 850, and in each ADC 80, the delay circuit 811 and the encoder 812 are arranged in the sequence of, from top to bottom, the delay circuit 811 and the encoder 812, then the reference voltage wire that is arranged to extend in the row direction of the pixel 3 is branched in the sequence of, from the left, the reference voltage wire for ADC 810, the reference voltage wire for ADC 820, the reference voltage wire for ADC 830, the reference voltage wire for ADC 840, and the reference voltage wire for ADC 850. The reference voltage wire for each ADC 80 extends in the column direction of the pixel array 3. The reference voltage wire for each ADC 80 is connected to each constituent component in the corresponding ADC 80. In the ADC 810, the reference voltage wire for the ADC 810 is connected in the sequence of, from the branch point of the reference voltage wire, the delay units (D1, D2, D3, . . . , Dn) in the delay circuit 811 and the encoder 812. In the same way, the reference voltage wire for ADC 820, the reference voltage wire for ADC 830, the reference voltage wire for ADC 840, and the reference voltage wire for ADC 850 are connected in the sequence of, from the branch point of the reference voltage wire, the delay units (D1, D2, D3, . . . , Dn) in the delay circuit 811 and the encoder 812, in each corresponding ADC 80.

By arranging the reference voltage wires as described above, the potentials of the reference voltage wires, which are made by branching the reference voltage wire for each ADC 80 in the row direction of the pixel array 3 at the branch point and are arranged to extend in the row direction of the pixel array 3, can be made almost equal. Further, by connecting the reference voltage wires only to each constituent component in corresponding ADC 80, each ADC 80 can be separated. Thereby, a noise that is made by the operation of the ADC 810 will not affect the operations of the ADC 820, . . . , ADC 850, for example. Also, a noise that is made by the operations of the ADC 820, . . . , ADC 850 will not affect the operation of the ADC 810. That is, each ADC 80 is not affected by a noise that is made by the operations of other ADC 80. A noise that is made by the operation of each ADC 80 does not affect the operations of other ADC 80.

Also, by connecting the reference voltage wire, which is branched for each ADC 80, in the sequence of, from the branch point of the reference voltage wire, the delay circuit 811 and the encoder circuit 812, a noise such as reference voltage generated in the self ADC 80 can be prevented from affecting the delay circuit 811. In the delay circuit 811, output is greatly affected by voltage fluctuation of the input signal and the reference voltage (GND in the example illustrated in the figures). In the encoder circuit 812, output is little affected by voltage fluctuation of the power-supply voltage and the reference voltage (GND). Thereby, for example, the delay circuit 811 in the ADC 810 is little affected by a noise such as a noise of the power-supply voltage and a noise of the reference voltage that is generated while the counter circuit 8121, the latch and encoder circuit 8122 and the adder 8123 in the encoder circuit 812 in the same ADC 810 are operating.

As is described above, in the second preferred embodiment of the present invention, the reference voltage wire is branched for each ADC 80, and the reference voltage wire branched for each ADC 80 can be connected only to each constituent component in the corresponding ADC 80. Thereby, a noise generated while each ADC 80 is operating can be separated. For example, the reference voltage of the delay unit included in the ADC 810 is supplied only to the constituent components of the self ADC 810, and separated from the reference voltage of the delay units included in other A/D converters (the ADC 820, . . . , the ADC 850). Thereby, the ADC 810 is little affected by a noise generated while other A/D converters (the ADC 820, . . . , the ADC 850) are operating.

Also, in the second preferred embodiment of the present invention, in the self ADC 80, the reference voltage wire can be connected to a circuit that has a low tolerance for noise and a circuit that is resistant to noise separately. Thereby, in the self ADC 80, the delay circuit can be little affected by a noise of the power-supply voltage and the reference voltage. Thereby, for example, in the ADC 810, the delay circuit 811 that has a low tolerance for noise is little affected by a noise generated while the encoder circuit 812 in the self ADC 810 is operating.

Thereby, in the second preferred embodiment of the present invention, even if the photoelectric conversion device includes a plurality of A/D converters, a noise generated while one A/D converter is operating can be preventing from affecting other A/D converters and the constituent components in the self A/D converter. Therefore, degradation of the image data can be prevented, and image data with little noise can be acquired.

The present invention imposes no stipulations on the method of detecting the number of stages of delay units in the delay circuit 811 passed by the input pulse signal φPL in the encoder 812 and the number of its circulations around the delay circuit 811, or on the method of calculating the most final digital value which is the result acquired when the ADC 81 or the ADC 810 makes an analog-digital conversion from the detected number of passed stages of delay units or the number of circulations.

While in the preferred embodiments described above, the ADC 81, ..., the ADC 85 and ADC 810, ..., the ADC 850 are arranged in accordance with the amount of light incident to the pixel array 3 arranged two-dimensionally in four rows and five columns, the present invention can be applied in an A/D converter that performs an analog-digital conversion of the output of a linear sensor including a plurality of pixels configured in one column.

While in the preferred embodiments described above, the column circuit 5 is arranged between the pixel array 3 and the ADC 8 or the ADC 80, the column circuit 5 need not be provided. If a pixel signal corresponding to the difference between a pixel reset signal of the pixel output signal and the optical signal is input to the ADC 8 or the ADC 80, then the analog-digital conversion can be performed in the same manner.

Figure 4:
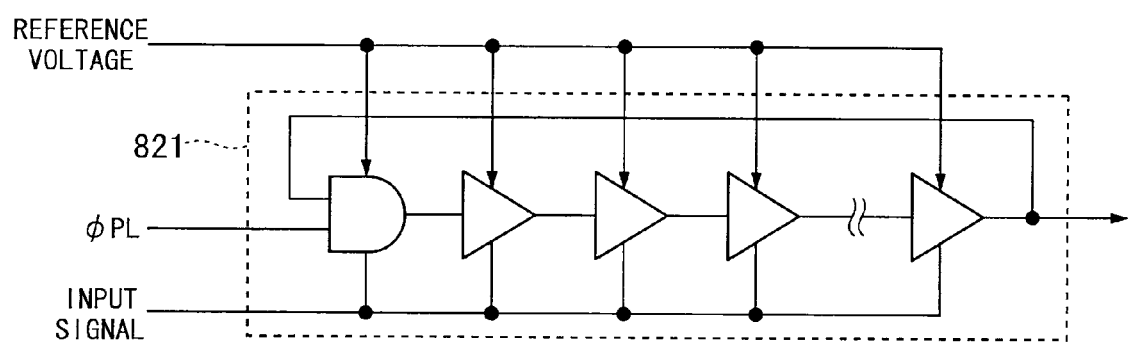
FIG. 4 is a block diagram illustrating another example of a configuration of a delay circuit in accordance with the second preferred embodiment of the present invention.
Figure 5:
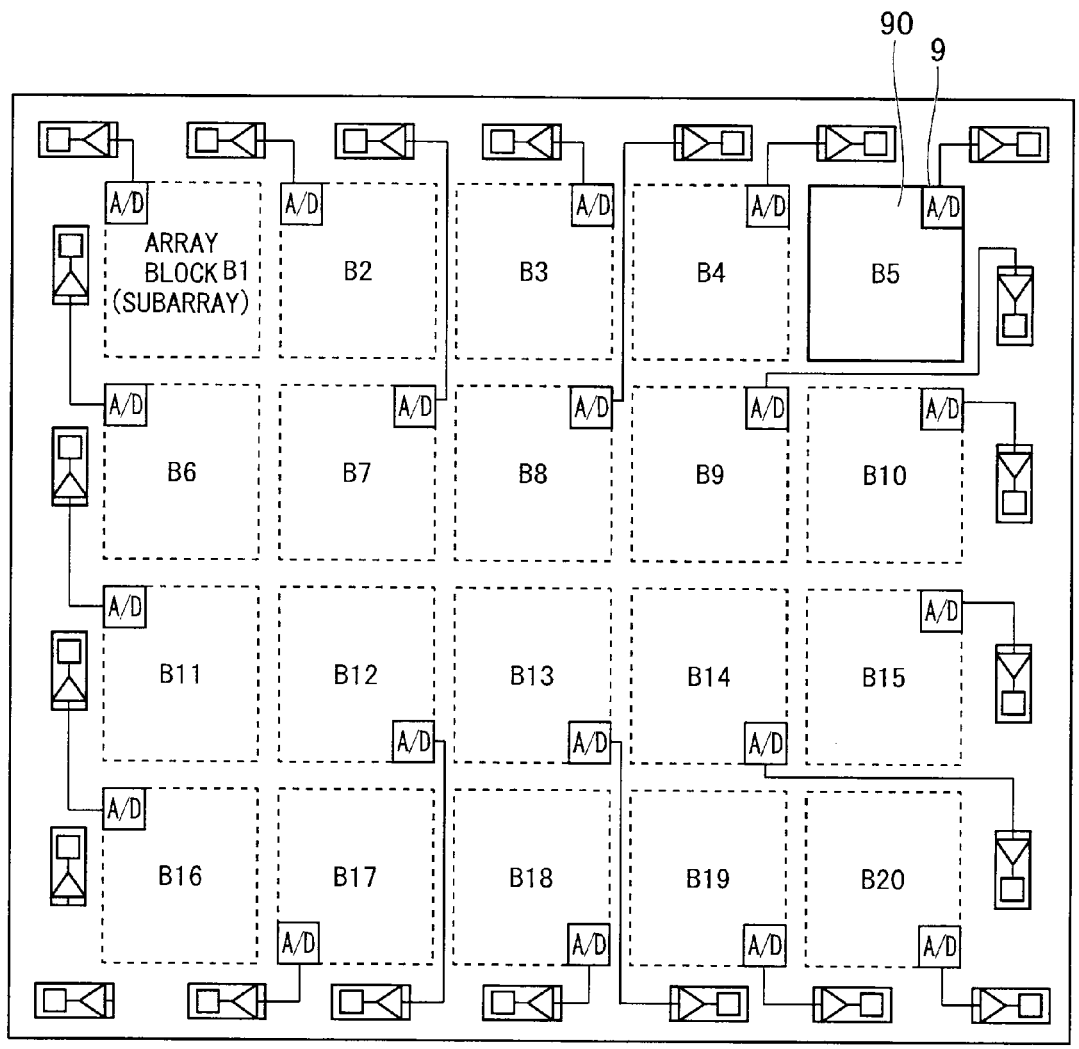
FIG. 5 is a block diagram illustrating a schematic configuration of a solid-state image-pickup device in accordance with the related art.
Figure 6:
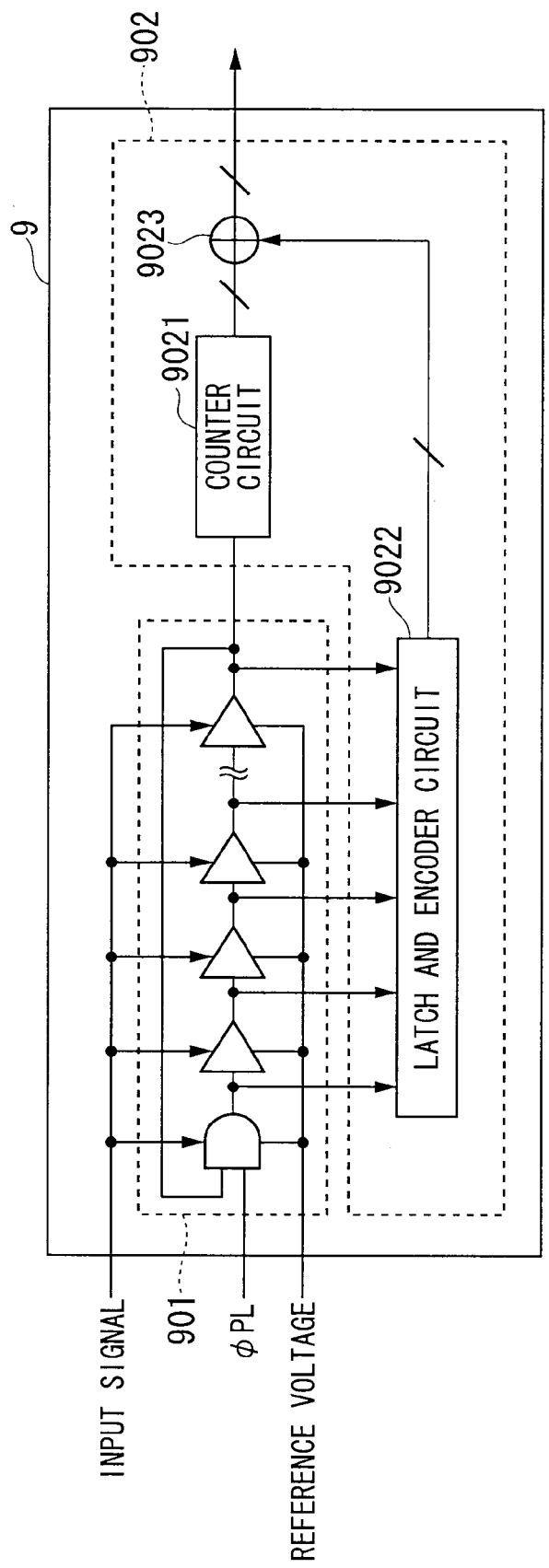
FIG. 6 is a block diagram illustrating an example of a circuit configuration of an A/D converter included in the solid-state image-pickup device in accordance with the related art.

In the above description, the delay units in the delay circuit 811 treat the power side as the input signal, i.e. the pixel signal that becomes the object of analog-digital conversion, and the ground side as a reference voltage. FIG. 4 is a block diagram illustrating another example of a configuration of the delay circuit 821 in accordance with the second preferred embodiment of the present invention. As shown by the delay circuit 821 of FIG. 4, the power side can be treated as the reference voltage and the ground side as the input side.

While not illustrated in the figures, if there are two types of input signals, then the configuration may be one where the power side is treated as a first input signal and the ground side is treated as a second input signal. Or, on the contrary, the configuration may be one where the power side is treated as a second input signal and the ground side is treated as a first input signal.

In the above description, in the delay circuit 811 and the delay circuit 821 in accordance with the preferred embodiments of the present invention, the first-stage delay unit D1 contains a negative AND circuit (a NAND gate) and an inverter circuit (an INV gate), while the other delay units D2, ..., Dn contain two inverter circuits (INV gates). In the present invention, there are no stipulations on the configuration of the delay circuit, which can have any configuration that enables an input pulse to circulate with a delay time that is in accordance with the difference between the voltage level of an input signal and a reference voltage level, or between the voltage levels of two input signals.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A photoelectric conversion device comprising:
   a pixel array that includes a plurality of pixels arranged two-dimensionally, each of the plurality of pixels having a photoelectric conversion element, the pixel array outputting a pixel signal in accordance with an incident light amount to the photoelectric conversion element; and
   a plurality of A/D converters each of which receives the pixel signal from the pixel array, converts the pixel signal to a digital value based on a reference voltage, and outputs the digital value; and
   wherein a reference voltage wire, which supplies the reference voltage to each of the plurality of A/D converters, is branched into a plurality of branched reference voltage wires each of which is corresponding to one of the plurality of A/D converters, and
   wherein each of the plurality of branched reference voltage wires is connected only to constituent components in a corresponding A/D converter.

2. The photoelectric conversion device according to claim 1, wherein
   the reference voltage wire is arranged to extend in a first direction of the pixel array,
   each of the plurality of branched reference voltage wire is arranged to extend in a second direction of the pixel array that is different from the first direction of the pixel array,
   the plurality of A/D converters are arranged in the first direction of the pixel array, and
   each of the plurality of A/D converters comprises:
   a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter; and
   an encoder that outputs the digital value based on the number of the plurality of delay units that the pulse signal passes through within a predetermined period of time.

3. The photoelectric conversion device according to claim 2, wherein a branch point, a first connection point, and a second connection point are arranged in the second direction in the sequence of the branch point, the first connection point, and the second connection point, each of the plurality of branched reference voltage wires is separated from the reference voltage wire at the branch point, the pulse delay circuit is connected to each of the plurality of branched reference voltage wires at the first connection point in the A/D converter, and the encoder is connected to each of the plurality of branched reference voltage wires at the second connection point in the A/D converter.

4. The photoelectric conversion device according to claim 3, wherein the first direction is a row direction of the pixel array,
the second direction is a column direction of the pixel array, and
the number of the plurality of A/D converters is based on the number of columns of the pixel array.

5. The photoelectric conversion device according to claim 2, wherein the encoder comprises:
a latch circuit that includes a plurality of latch units each of which corresponds to the plurality of delay units included in the pulse delay circuit, each of the plurality of latch units storing delay information that is output from each of the plurality of delay units; and
an encoder unit that outputs the digital value based on the delay information that is stored in the latch circuit, and
wherein a branch point, a first connection point, and a second connection point are arranged in the second direction in the sequence of the branch point, the first connection point, and the second connection point, each of the plurality of branched reference voltage wires is separated from the reference voltage wire at the branch point, each of the delay units is connected to each of the plurality of branched reference voltage wires at the first connection point in the A/D converter, each of the latch units corresponding to each of the delay units is connected to each of the plurality of branched reference voltage wires at the second connection point in the A/D converter,
wherein a plurality of the first connection points in the A/D converter, a plurality of the second connection points in the A/D converter, and a third connection point are arranged in the second direction, the encoder unit is connected to each of the plurality of branched reference voltage wires at the third connection point in the A/D converter, and
wherein the plurality of the first connection points and the plurality of the second connection points are arranged between the branch point and the third connection point.

6. The photoelectric conversion device according to claim 5, wherein
the first direction is a row direction of the pixel array,
the second direction is a column direction of the pixel array, and
the number of the plurality of A/D converters is based on the number of columns of the pixel array.

7. A photoelectric conversion device comprising:
a pixel array that includes a plurality of pixels arranged two-dimensionally, each of the plurality of pixels having a photoelectric conversion element, the pixel array outputting a pixel signal in accordance with an incident light amount to the photoelectric conversion element;
a plurality of A/D converters each of which receives the pixel signal from the pixel array, converts the pixel signal to a digital value based on a reference voltage, and outputs the digital value;
a reference voltage wire that supplies the reference voltage to each of the plurality of A/D converters; and
a plurality of branched reference voltage wires each of which is corresponding to one of the plurality of A/D converters, the reference voltage wire being branched into the plurality of branched reference voltage wires, each of the plurality of branched reference voltage wires being connected only to constituent components in a corresponding A/D converter.

8. The photoelectric conversion device according to claim 7, wherein
the reference voltage wire is arranged to extend in a first direction of the pixel array,
each of the plurality of branched reference voltage wire is arranged to extend in a second direction of the pixel array that is different from the first direction of the pixel array,
the plurality of A/D converters are arranged in the first direction of the pixel array, and
each of the plurality of A/D converters comprises:
a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter; and
an encoder that outputs the digital value based on the number of the plurality of delay units that the pulse signal passes through within a predetermined period of time.

9. The photoelectric conversion device according to claim 8, wherein a branch point, a first connection point, and a second connection point are arranged in the second direction in the sequence of the branch point, the first connection point, and the second connection point, each of the plurality of branched reference voltage wires is separated from the reference voltage wire at the branch point, the pulse delay circuit is connected to each of the plurality of branched reference voltage wires at the first connection point in the A/D converter, and the encoder is connected to each of the plurality of branched reference voltage wires at the second connection point in the A/D converter.

10. The photoelectric conversion device according to claim 9, wherein
the first direction is a row direction of the pixel array,
the second direction is a column direction of the pixel array, and
the number of the plurality of A/D converters is based on the number of columns of the pixel array.

11. The photoelectric conversion device according to claim 8, wherein the encoder comprises:
a latch circuit that includes a plurality of latch units each of which corresponds to the plurality of delay units included in the pulse delay circuit, each of the plurality of latch units storing delay information that is output from each of the plurality of delay units; and
an encoder unit that outputs the digital value based on the delay information that is stored in the latch circuit, and
wherein a branch point, a first connection point, and a second connection point are arranged in the second direction in the sequence of the branch point, the first connection point, and the second connection point, each of the plurality of branched reference voltage wires is separated from the reference voltage wire at the branch point, each of the delay units is connected to each of the plurality of branched reference voltage wires at the first connection point in the A/D converter, each of the latch units corresponding to each of the delay units is connected to each of the plurality of branched reference voltage wires at the second connection point in the A/D converter,
wherein a plurality of the first connection points in the A/D converter, a plurality of the second connection points in the A/D converter, and a third connection point are arranged in the second direction, the encoder unit is connected to each of the plurality of branched reference voltage wires at the third connection point in the A/D converter, and wherein the plurality of the first connection points and the plurality of the second connection points are arranged between the branch point and the third connection point.

12. The photoelectric conversion device according to claim 11, wherein
the first direction is a row direction of the pixel array,
the second direction is a column direction of the pixel array, and
the number of the plurality of A/D converters is based on the number of columns of the pixel array.

13. A photoelectric conversion device comprising:
a plurality of A/D converters each of which receives a pixel signal from a pixel array that includes a plurality of pixels arranged two-dimensionally, each of the plurality of pixels having a photoelectric conversion element, the pixel array outputting the pixel signal in accordance with an incident light amount to the photoelectric conversion element, the plurality of A/D converters converting the pixel signal to a digital value based on a reference voltage, the plurality of A/D converters outputting the digital value, and
wherein a reference voltage wire, which supplies the reference voltage to each of the plurality of A/D converters, is branched into a plurality of branched reference voltage wires each of which is corresponding to one of the plurality of A/D converters, and
wherein each of the plurality of branched reference voltage wires is connected only to constituent components in a corresponding A/D converter.

14. The photoelectric conversion device according to claim 13, wherein
the reference voltage wire is arranged to extend in a first direction of the pixel array,
each of the plurality of branched reference voltage wire is arranged to extend in a second direction of the pixel array that is different from the first direction of the pixel array,
the plurality of A/D converters are arranged in the first direction of the pixel array, and
each of the plurality of A/D converters comprises:
a pulse delay circuit that is connected to a plurality of delay units, each of the plurality of delay units makes a pulse signal delay with a delay time that is based on the difference between a voltage of the pixel signal, which is received from the pixel array, and the reference voltage, which is supplied to the A/D converter; and
an encoder that outputs the digital value based on the number of the plurality of delay units that the pulse signal passes through within a predetermined period of time.

15. The photoelectric conversion device according to claim 14, wherein a branch point, a first connection point, and a second connection point are arranged in the second direction in the sequence of the branch point, the first connection point, and the second connection point, each of the plurality of branched reference voltage wires is separated from the reference voltage wire at the branch point, the pulse delay circuit is connected to each of the plurality of branched reference voltage wires at the first connection point in the A/D converter, and the encoder is connected to each of the plurality of branched reference voltage wires at the second connection point in the A/D converter.

16. The photoelectric conversion device according to claim 15, wherein
the first direction is a row direction of the pixel array,
the second direction is a column direction of the pixel array, and
the number of the plurality of A/D converters is based on the number of columns of the pixel array.

17. The photoelectric conversion device according to claim 14, wherein the encoder comprises:
a latch circuit that includes a plurality of latch units each of which corresponds to the plurality of delay units included in the pulse delay circuit, each of the plurality of latch units storing delay information that is output from each of the plurality of delay units; and
an encoder unit that outputs the digital value based on the delay information that is stored in the latch circuit, and
wherein a branch point, a first connection point, and a second connection point are arranged in the second direction in the sequence of the branch point, the first connection point, and the second connection point, each of the plurality of branched reference voltage wires is separated from the reference voltage wire at the branch point, each of the delay units is connected to each of the plurality of branched reference voltage wires at the first connection point in the A/D converter, each of the latch units corresponding to each of the delay units is connected to each of the plurality of branched reference voltage wires at the second connection point in the A/D converter,
wherein a plurality of the first connection points in the A/D converter, a plurality of the second connection points in the A/D converter, and a third connection point are arranged in the second direction, the encoder unit is connected to each of the plurality of branched reference voltage wires at the third connection point in the A/D converter, and
wherein the plurality of the first connection points and the plurality of the second connection points are arranged between the branch point and the third connection point.

18. The photoelectric conversion device according to claim 17, wherein
the first direction is a row direction of the pixel array,
the second direction is a column direction of the pixel array, and
the number of the plurality of A/D converters is based on the number of columns of the pixel array.

* * * * *